Patented Oct. 15, 1929

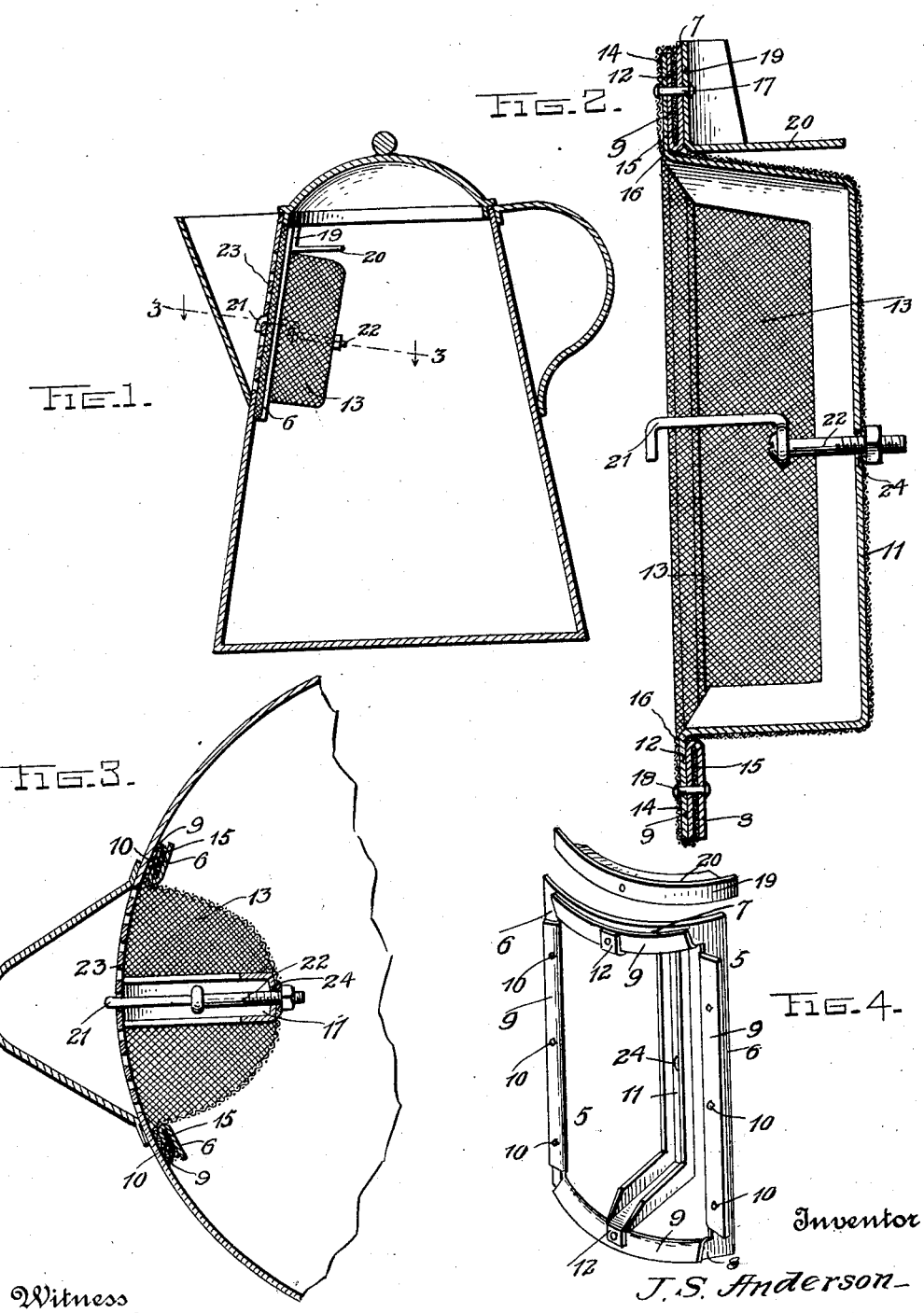

1,731,698

UNITED STATES PATENT OFFICE

JAMES S. ANDERSON, OF AMES, NEBRASKA

COFFEEPOT STRAINER

Application filed July 22, 1929. Serial No. 380,061.

The device relates to a new and improved straining attachment designed primarily for use within coffee pots although useful also on certain types of tea pots.

The principal object of the invention is to provide an exceptionally simple and inexpensive, easily attached and efficient strainer which will positively prevent any tea or coffee grounds from flowing out with the tea or coffee.

A further object is to provide the attachment with a plate disposed over the strainer and adapted to check any floating grounds when pouring, preventing them from reaching the rim of the pot.

With the foregoing in view, the invention resides in the novel subject matter hereinafter described and claimed, description being accomplished by reference to the accompanying drawing.

Fig. 1 is a vertical sectional view through a conventional coffee pot showing a side elevation of the invention applied.

Fig. 2 is an enlarged vertical sectional view through the strainer.

Fig. 3 is a horizontal sectional view on line 3—3 of Fig. 1.

Fig. 4 is a perspective view of the frame and the bar and plate which are secured to said frame.

The drawing above briefly described, illustrates the preferred form of construction and while this construction will be herein specifically explained, it is to be understood that within the scope of the invention as claimed, variations may be made.

The numeral 5 denotes a substantially rectangular frame having parallel vertical side bars 6 and upper and lower end bars 7 and 8 respectively, said end bars being curved in accordance with the curvature of a tea or coffee pot wall. The inner edges of the side and end bars 6—7—8 are provided with integral strainer-anchoring flanges 9 lying at the outer sides of said bars and preferably provided with spurs 10 projecting toward said bars.

A vertical bar 11, preferably of channel form throughout the greater part of its length, is bent into substantially C-shape and is provided at the outer ends of its upper and lower arms, with vertical lugs 12 lying at the outer sides of the flanges 9 of the end bars 7 and 8. A strainer 13 of basket shape lies against the outer side of the bar 11 and is held against distortion by this bar. The rim portion of the strainer 13 passes through the frame 5, is bent outwardly at 14 against the outer sides of the flanges 9, and is then bent inwardly at 15 between said flanges and the bars 6—7—8, said flanges being clinched to effectively anchor the strainer edges to the frame. This anchorage is facilitated by the spurs 10 which engage the strainer portions 15. Preferably, the lugs 12 are at the inner sides of the upper and lower portions 14 of the rim, between said portions and the flanges 9, said lugs being passed through slots in the strainer at 16. Upper and lower rivets 17 and 18 respectively, pass through the portions 14—12—9—15—7—8 of the device and tightly secure them together. The upper rivet 17 passes also through an upstanding flange 19 on a horizontal plate 20 which overlies the strainer, and additional fasteners may be provided if desired securing said flange to the frame 5. The plate 20 serves to check floating tea or coffee grounds and prevents them from reaching the rim of the pot when pouring.

An attaching device is provided for the straining attachment, composed of a hook 21 and a bolt 22 connected therewith. The hook 21 is adapted for engagement with the conventional perforated portion 23 of the pot, which portion is surrounded by the rim of the straining attachment, as will be clear from Figs. 1 and 3. The bolt 22 passes through an opening 24 in the center of the bar 11 and upon tightening of the nut of said bolt, the attachment is firmly secured in place. If required, however, it may readily be detached, for instance to permit thorough cleaning. If desired, a number of the attaching devices may be furnished with each strainer so that a new one may be used when re-applying the device after removing it.

It will be seen from the foregoing that a very simple and inexpensive device has been provided, one which may be easily applied or removed, and one which will be efficient and desirable. The details disclosed are preferably followed as above stated, but within the scope of the invention as claimed, variations may be made.

I claim:—

A pot strainer comprising a frame to surround the usual perforated area of the pot wall, a bar spanning said frame and having an opening between its ends, an attaching device passing through said opening and adapted for engagement with said perforated wall portion of the pot, a strainer lying against the outer side of said bar and anchored at its edges to said frame, and a plate overlying said strainer to check floating grounds when pouring, said plate being provided with an upstanding flange secured to the upper end of said frame.

In testimony whereof I have hereunto affixed my signature.

JAMES S. ANDERSON.